(12) United States Patent
Jung

(10) Patent No.: US 8,805,162 B2
(45) Date of Patent: Aug. 12, 2014

(54) STORAGE MEDIUM INCLUDING AV DATA AND APPLICATION PROGRAM, AND APPARATUS AND METHOD USING THE SAME

(75) Inventor: Kil-soo Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1047 days.

(21) Appl. No.: 12/496,811

(22) Filed: Jul. 2, 2009

(65) Prior Publication Data

US 2009/0269030 A1 Oct. 29, 2009

Related U.S. Application Data

(63) Continuation of application No. 11/188,874, filed on Jul. 26, 2005, now Pat. No. 7,697,819.

(30) Foreign Application Priority Data

Jul. 30, 2004 (KR) .................................. 2004-60118
Jun. 2, 2005 (KR) .................................. 2005-47182

(51) Int. Cl.
*H04N 9/80* (2006.01)

(52) U.S. Cl.
USPC ......................................................... 386/248

(58) Field of Classification Search
USPC ................................................. 386/291, 248
See application file for complete search history.

(56) References Cited

U.S. PATENT DOCUMENTS

| | | | |
|---|---|---|---|
| 5,737,639 A | 4/1998 | Ohmori | |
| 5,771,334 A * | 6/1998 | Yamauchi et al. | ............ 386/239 |
| 5,819,275 A * | 10/1998 | Badger et al. | ................ 707/758 |
| 5,929,857 A | 7/1999 | Dinallo et al. | |
| 5,966,352 A | 10/1999 | Sawabe et al. | |
| 6,480,669 B1 | 11/2002 | Tsumagari et al. | |
| 6,507,696 B1 | 1/2003 | Chung et al. | |
| 6,560,403 B1 | 5/2003 | Tanaka et al. | |
| 6,564,255 B1 | 5/2003 | Mobini et al. | |
| 6,580,870 B1 * | 6/2003 | Kanazawa et al. | ............ 386/240 |
| 6,999,674 B1 | 2/2006 | Hamada | |
| 7,370,065 B1 * | 5/2008 | Rys | ....................................... 1/1 |

(Continued)

FOREIGN PATENT DOCUMENTS

| | | |
|---|---|---|
| CN | 1516159 A | 7/2004 |
| CN | 1867999 A | 11/2006 |

(Continued)

OTHER PUBLICATIONS

Tanenbaum, "Structured Computer Organization", pp. 10-12, 1984.*

(Continued)

*Primary Examiner* — David Harvey

(74) *Attorney, Agent, or Firm* — NSIP Law

(57) ABSTRACT

A storage medium including audio-video (AV) data and application programs for providing additional functions using the AV data includes: movie mode data for reproducing audio-visual (AV) data; program mode data including a plurality of application programs for providing additional functions using the AV data; system data for controlling the execution of the movie mode data and the program mode data; and management information for managing the execution of the application programs in a unit of title, wherein the system data comprises mode information indicating whether a reproduction mode of a title to be reproduced is a movie mode or a program mode.

10 Claims, 13 Drawing Sheets

(56) References Cited

U.S. PATENT DOCUMENTS

| | | | |
|---|---|---|---|
| 7,448,021 B1 | 11/2008 | Lamkin et al. | |
| 7,515,812 B2 * | 4/2009 | Ikeda et al. | 386/241 |
| 7,764,868 B2 * | 7/2010 | Okada et al. | 386/241 |
| 8,224,158 B2 * | 7/2012 | Yoon et al. | 386/257 |
| 2002/0088011 A1 | 7/2002 | Lamkin et al. | |
| 2002/0194618 A1 * | 12/2002 | Okada et al. | 725/132 |
| 2003/0012558 A1 | 1/2003 | Kim et al. | |
| 2003/0021593 A1 * | 1/2003 | Otsuka et al. | 386/126 |
| 2003/0049017 A1 | 3/2003 | Chung et al. | |
| 2003/0081943 A1 * | 5/2003 | Kim et al. | 386/125 |
| 2003/0084460 A1 | 5/2003 | Chung et al. | |
| 2003/0147635 A1 * | 8/2003 | Jung et al. | 386/125 |
| 2003/0161615 A1 | 8/2003 | Tsumagari et al. | |
| 2003/0174170 A1 * | 9/2003 | Jung et al. | 345/767 |
| 2004/0073950 A1 * | 4/2004 | Tan et al. | 725/135 |
| 2004/0081425 A1 * | 4/2004 | Stone et al. | 386/46 |
| 2004/0131334 A1 | 7/2004 | Jung et al. | |
| 2004/0190861 A1 | 9/2004 | Chung et al. | |
| 2004/0190875 A1 | 9/2004 | Chung et al. | |
| 2004/0190876 A1 | 9/2004 | Chung et al. | |
| 2004/0247294 A1 | 12/2004 | Jung et al. | |
| 2005/0025249 A1 * | 2/2005 | Zhao et al. | 375/240.24 |
| 2005/0117886 A1 | 6/2005 | Kang et al. | |
| 2007/0140653 A1 * | 6/2007 | Kozuka et al. | 386/95 |

FOREIGN PATENT DOCUMENTS

| | | | |
|---|---|---|---|
| EP | 0791925 | | 8/1997 |
| EP | 1551027 | | 7/2005 |
| EP | 1 672 637 | | 6/2006 |
| JP | 7-14313 | | 1/1995 |
| JP | 2000-322875 | | 11/2000 |
| JP | 2001-135066 | | 5/2001 |
| JP | 2001-352523 | | 12/2001 |
| JP | 2002-343062 | | 11/2002 |
| JP | 2003-249057 | | 9/2003 |
| KR | 2004-51446 | | 6/2004 |
| TW | 498319 | | 8/2002 |
| TW | 517493 | | 1/2003 |
| WO | WO 92/00647 | | 1/1992 |
| WO | WO 02/091728 | * | 11/2002 |
| WO | WO 2004/025651 | * | 3/2004 |
| WO | WO 2004/030356 | | 4/2004 |
| WO | WO 2004/049710 | | 6/2004 |
| WO | WO 2004/084212 | | 9/2004 |
| WO | 2005366555 | * | 4/2005 |
| WO | WO 2005/036383 | | 4/2005 |

OTHER PUBLICATIONS

Japanese Notice of Reason for Rejection dated Apr. 17, 2012, issued in counterpart Japanese Patent Application No. 2009-161234; 4 pages including English translation.

The fourth Office Action issued by the State Intellectual Property Office of P.R. China on Sep. 15, 2011, in counterpart Chinese Patent Application No. 200580025708.1 (17 pages with English translation).

English Translation of Office Action issued by the Japanese Patent Office on Feb. 13, 2011, in counterpart Japanese Patent Application No. 2009-161234.

English Translation of Office Action issued by the State Intellectual Property Office of P.R. China on Dec. 31, 2011, in counterpart Chinese Patent Application No. 200580025708.1

European Search Report issued on Feb. 3, 2011, in corresponding European Patent Application No. 10182372.2 (12 pages).

"Application Definition Blu-ray Disc Format BD-J Baseline Application and Logical Model Definition for BD-ROM", Internet Citation, Mar. 1, 2005, pp. 1-45, URL: http://www.blurayjukebox.com/pdfs/bdj_gem_application_definition_0503.

Search Report issued in International Patent Application No. PCT/KR2005/002464 on Oct. 31, 2005.

Office Action issued in Taiwanese Patent Application No. 094125536 on Aug. 14, 2006.

U.S. Appl. No. 11/188,874, filed Jul. 26, 2005, Jung.

Chinese Office Action issued on Jun. 2, 2011, in counterpart Chinese Patent Application No. 201010259134.7 (8 pages including English translation).

Chinese Office Action issued on Jul. 7, 2011, in counterpart Chinese Patent Application No. 201010189933.1 (10 pages including English translation).

Japanese Office Action issued on Aug. 9, 2011, in counterpart Japanese Patent Application No. 2007-523480(3 pages including English translation).

Chinese Notification of Grant issued on Jan. 6, 2013 in counterpart Chinese Patent Application No. 201010259134.7 (8 pages, including English language translation).

Notification of Granting of Patent Right to Invention issued Aug. 13, 2013 in counterpart Chinese Application No. 201010189932.7. (8 pages, in Chinese, with English translation).

* cited by examiner

STORAGE MEDIUM INCLUDING AV DATA AND APPLICATION PROGRAM, AND APPARATUS AND METHOD USING THE SAME

CROSS-REFERENCE TO RELATED PATENT APPLICATIONS

This application is a continuation of application Ser. No. 11/188,874, filed on Jul. 26, 2005 now U.S. Pat. No. 7,697,819, and claims the benefit of Korean Patent Application No. 2005-47182, filed on Jun. 2, 2005 in the Korean Intellectual Property Office, and Korean Patent Application No. 2004-60118, filed on Jul. 30, 2004 in the Korean Intellectual Property Office, the disclosures of which are incorporated herein in their entirety by reference.

BACKGROUND OF THE INVENTION

1. Field of the Invention

Aspects of the present invention relate to the reproduction of audio-visual (AV) data recorded in a storage medium, and more particularly, to a storage medium including AV data and application programs for providing additional functions using the AV data, and an apparatus and method for reproducing the same.

2. Description of the Related Art

Audio-visual (AV) data recorded in a storage medium includes compressed and encoded AV information, and navigation information for reproducing the AV information. In more detail, the AV information is composed of an AV stream encoded according to a Motion Picture Experts Group (MPEG) standard. The AV stream includes video, audio, and/or subtitles. In addition, the AV data can further include information such as an encoding attribute of the AV stream or an entry point for random access, and a playlist in which AV reproduction order information is defined.

The navigation information is composed of navigation commands for controlling the reproduction of the AV information, such as a command for reproducing the playlist and a command for branching off to another playlist. Thus, the AV information can be reproduced by referring to the navigation information, and thereby a user can watch the AV data such as a high quality movie.

In addition to the basic AV data reproduction function, there is demand for applications including programming functions for improving interaction with the user. However, according to conventional storage media including AV data, program data for providing a user interactive function, such as games or chatting using the AV data being reproduced, cannot be recorded in the storage medium with the AV data.

SUMMARY OF THE INVENTION

An aspect of the present invention provides a storage medium in which program-based applications for providing audio-visual (AV) data and additional functions using the AV data are recorded in order to provide reproduction of the AV data and an improved program function, and an apparatus and method for reproducing the storage medium.

According to an aspect of the present invention, there is provided a storage medium comprising: movie mode data for reproducing audio-visual (AV) data; program mode data including a plurality of application programs for providing additional functions using the AV data; system data for controlling the execution of the movie mode data and the program mode data; and management information for managing the execution of the application programs in a unit of title, wherein the system data comprises mode information indicating whether a reproduction mode of a title to be reproduced is a movie mode or a program mode.

According to an aspect of the present invention, the program mode data is implemented as a JAVA object.

According to an aspect of the present invention, the JAVA object comprises at least one JAVA application program included in a title.

According to an aspect of the present invention, the management information is included in the JAVA object.

According to an aspect of the present invention, the management information comprises control information and state information for execution of at least one application program to be executed in a title.

According to an aspect of the present invention, the mode information is included in each item of title information in the system data and determines the reproduction mode of a relevant title.

According to another aspect of the present invention, there is provided a reproducing apparatus comprising: a read unit which reads movie mode data for reproducing audio-visual (AV) data, program mode data including a plurality of application programs for providing additional functions using the AV data, system data for controlling the execution of the movie mode data and the program mode data, and management information for managing the execution of the application programs in a unit of title; and a reproducing unit which determines a reproduction mode by referring to mode information, which is included in the system data and indicates whether the reproduction mode of a title to be reproduced is a movie mode or a program mode, and reproduces the program mode data by referring to the management information if the reproduction mode is the program mode.

According to an aspect of the present invention, if the mode information of the title to be reproduced is set to the movie mode, the reproducing unit reproduces each movie object using reference information of the movie object included in title information corresponding to the title in the system data.

According to an aspect of the present invention, if the mode information of the title to be reproduced is set to the program mode, the reproducing unit refers to each JAVA object included in title information corresponding to the title in the system data and reproduces JAVA application programs using management information included in the JAVA object.

According to another aspect of the present invention, there is provided a reproducing method comprising: reading movie mode data for reproducing audio-visual (AV) data, program mode data including a plurality of application programs for providing additional functions using the AV data, system data for controlling the execution of the movie mode data and the program mode data, and management information for managing the execution of the application programs in a unit of title; and determining a reproduction mode by referring to mode information, which is included in the system data and indicates whether the reproduction mode of a title to be reproduced is a movie mode or a program mode, and reproducing the program mode data by referring to the management information if the reproduction mode is the program mode.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent and more readily appreciated by describing in detail exemplary embodiments thereof with reference to the accompanying drawings in which.

DETAILED DESCRIPTION OF THE EMBODIMENTS

Figure 1:
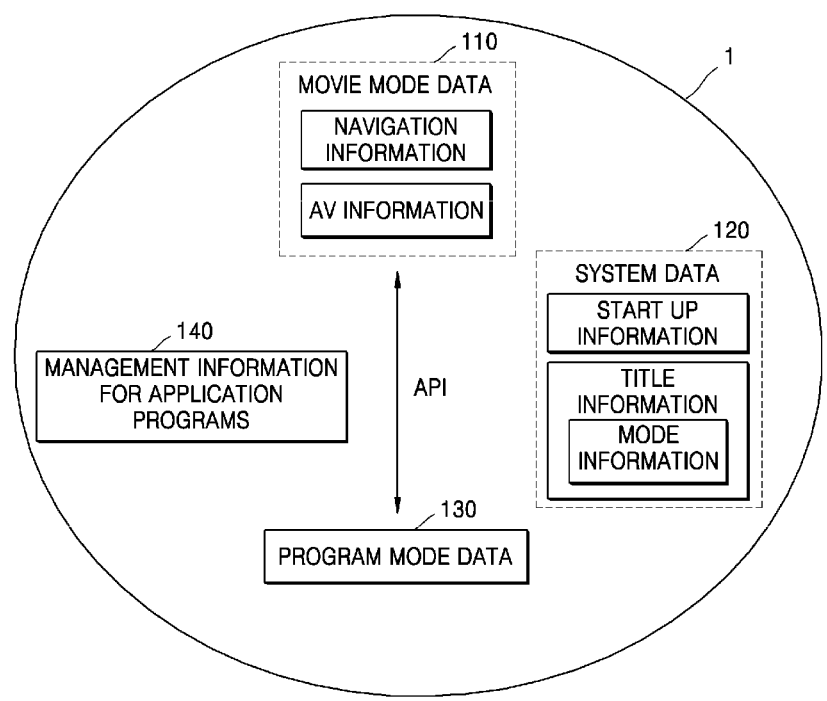
FIG. 1 is an illustration of the types of data recorded in a storage medium according to an embodiment of the present invention.

Reference will now be made in detail to the present embodiments of the present invention, examples of which are illustrated in detail with reference to the accompanying drawings, wherein like reference numerals refer to the like elements throughout. The embodiments are described below in order to explain the present invention by referring to the figures.

FIG. 1 is an illustration of the types of data recorded in a storage medium 1 according to an embodiment of the present invention. Referring to FIG. 1, the storage medium 1 includes movie mode data 110, program mode data 130, system data 120, and management information for application programs 140.

The movie mode data 110 includes audio-visual (AV) information and navigation information, which is a set of commands for reproducing the AV information. The movie mode data 110 is data for basic AV reproduction and is called data for a core mode. The core mode is called a movie mode since it is a mode in which data required for watching a movie is reproduced, as with the digital versatile disk (DVD) format, which is a representative video application. Hereinafter, the core mode is called the movie mode. If data includes the movie mode data 110 and data having a programming function for improving interaction with a user (i.e., the program mode data 130), the data is called data for a full mode or full mode data. While described as the movie being the core mode, it is understood that other data (such as the program made or an audio only mode) could be the core mode with the movie being used in a full data mode.

The system data 120 is read first when a reproducing apparatus (such as that shown in FIG. 5) is initialized, and includes start up information and title information. The start up information includes the location of an object to be reproduced first when the storage medium 1 is reproduced by the reproducing apparatus. The title information includes entry point information including the location of each object to be reproduced.

Besides the AV reproduction, the program mode data 130 can include program data for at least one application program for providing an additional function according to an aspect of the invention. Examples of the program include a user interactive function, a game function using video, a function for displaying the director's commentary while reproducing a portion of video, a function for displaying other additional information while reproducing a portion of video, or a function for chatting while reproducing video. According to an aspect of the invention, the program mode data 130 can include Application Program Interface (API) functions for a presentation engine reproducing the AV information in order to execute application programs with reproduced video.

The management information for application programs 140 is information for efficiently managing the reproduction of the program mode data 130 when an additional function is provided while reproducing the AV data recorded in the storage medium (i.e., when full mode data is reproduced), and will be described in detail below.

While not required in all aspects, it is preferable that the storage medium 1 according to the present embodiment be easily loaded into and unloaded from a reproducing apparatus. While not required in all aspects, it is also preferable that the storage medium be an optical disk from which data can be read using an optical device of the reproducing apparatus. For example, the storage medium may be an optical disk, such as a CD-ROM, DVD, or BD-ROM, or an optical disk to be developed in the future.

Figure 5:
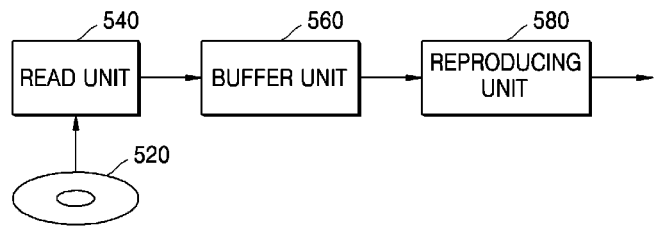
FIG. 5 is a schematic block diagram of a reproducing apparatus according to an embodiment of the present invention.

The structure of a reproducing apparatus for reproducing the storage medium according to the present embodiment will now be described with reference to FIG. 5, which is a schematic block diagram of a reproducing apparatus according to an embodiment of the present invention. Referring to FIG. 5, the reproducing apparatus is an apparatus for displaying AV data recorded in a storage medium 520 using specific mode data, and includes a read unit 540, a buffer unit 560, and a reproducing unit 580. The read unit 540 reads data to be reproduced from the storage medium 520. If the storage medium 520 is an optical disk, the read unit 540 includes an optical device for reading data recorded on the optical disk. The buffer unit 560 temporarily stores the data read by the read unit 540. The reproducing unit 580 reproduces the AV data and/or program data according to system data 120 and management information for application programs 140 stored in the buffer unit 560. The reproduced data is displayed through a display unit (not shown). While not required, it is understood that the apparatus can further record data in addition to reproducing the data.

Figure 6:
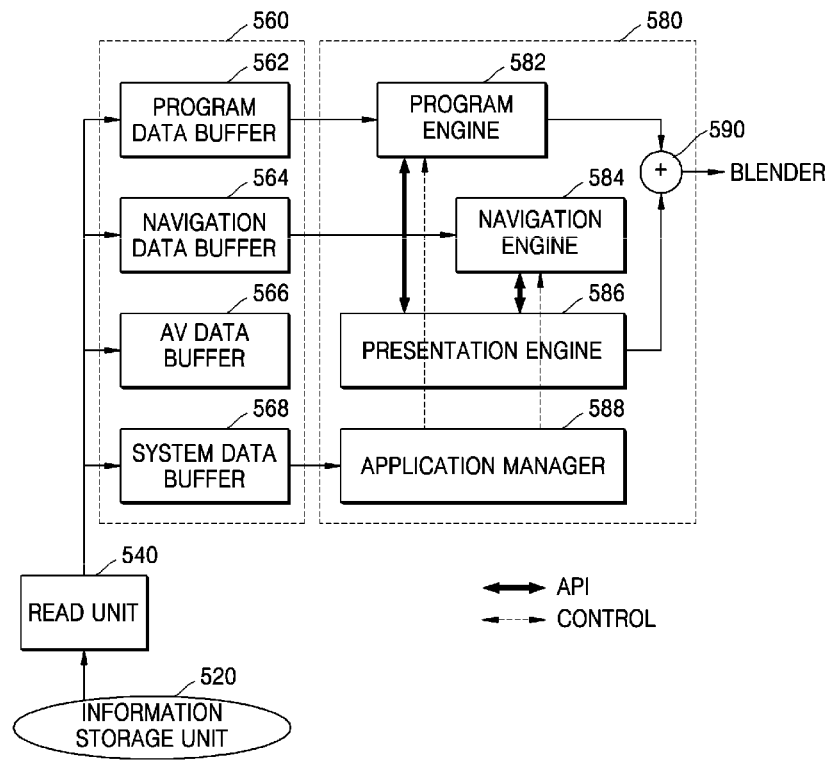
FIG. 6 is a detailed block diagram of the reproducing apparatus according to an embodiment of the present invention.

FIG. 6 is a detailed block diagram of the reproducing apparatus according to an embodiment of the present invention. Referring to FIG. 6, the buffer unit 560 and the reproducing unit 580 illustrated in FIG. 5 are illustrated in more detail. The buffer unit 560 includes a program data buffer 562 for temporarily storing data input from the read unit 540 according to its data type, a navigation data buffer 564, an AV data buffer 566, and a system data buffer 568. The reproducing unit 580 includes reproducing engines having reproducing functions according to the reproduced data types: a program engine 582, a navigation engine 584, a presentation engine 586, an application manager 588, and a blender 590. While not required, it is understood that other elements can be included in the reproducing apparatus.

The program engine 582 reproduces program data input from the program data buffer 562. That is, the program engine 582 executes specific application programs which implement functions such as games, chatting, and director's commentary. To do this, the program engine 582 can provide interaction with a user by video. The program engine 582 controls the presentation engine 586 which reproduces video using API functions as indicated by the dark arrow.

The navigation engine 584 receives navigation data from the navigation data buffer 564 and controls the reproduction of AV data. That is, like the program engine 582, the navigation engine 584 controls the presentation engine 586 to reproduce AV information using API functions composed of commands for AV reproduction as indicated by the dark arrow.

The presentation engine 586 decodes and reproduces an AV stream, a still image, or a data file input from the AV data buffer 566. The application manager 588 receives system data from the system data buffer 568, and controls the reproducing engines 582, 584, and 586 to reproduce AV data and/or program data. The application manager 588 controls the program engine 582 and the navigation engine 584 so that the presentation engine 586 can reproduce AV data and perform additional functions as indicated by the dashed arrows. The application manager 588 determines data to be reproduced first based on an entry point specified in start up information in the system data. In addition, during reproduction, the application manager 588 transmits an entry point of each title, obtained by referring to the system data and searching for each title, to a reproducing engine that reproduces the searched title so that the searched title can be reproduced.

When a full mode is selected for providing AV reproduction and a program function, the application manager 588 manages a plurality of applications on a title-by-title basis by referring to the management information for application program 140. That is, the application manager 588 performs scheduling and manages resources, such as memory, so that a plurality of applications can be smoothly performed. As another embodiment described in FIG. 11 and below, in a case where management information for application programs 140A is included in a JAVA object, which is program mode data 130A, the program engine 582 instead of the application manager 588 refers to the management information for application programs 140A included in the JAVA object, and performs scheduling and resource management so that a plurality of applications included in the JAVA object can be smoothly performed.

In addition, the application manager 588 selectively includes a user input receiving and processing unit (not shown) for processing a user's input and transmitting the user's input to a relevant engine.

The blender 590 generates one image by overlaying a graphic image reproduced by the program engine 582 using the API functions related to the presentation engine 586 with a video image reproduced by the presentation engine 586, and outputs the generated image. Thus, an additional function can be implemented simultaneously with reproducing video using program-based program mode data 130.

Figure 11:
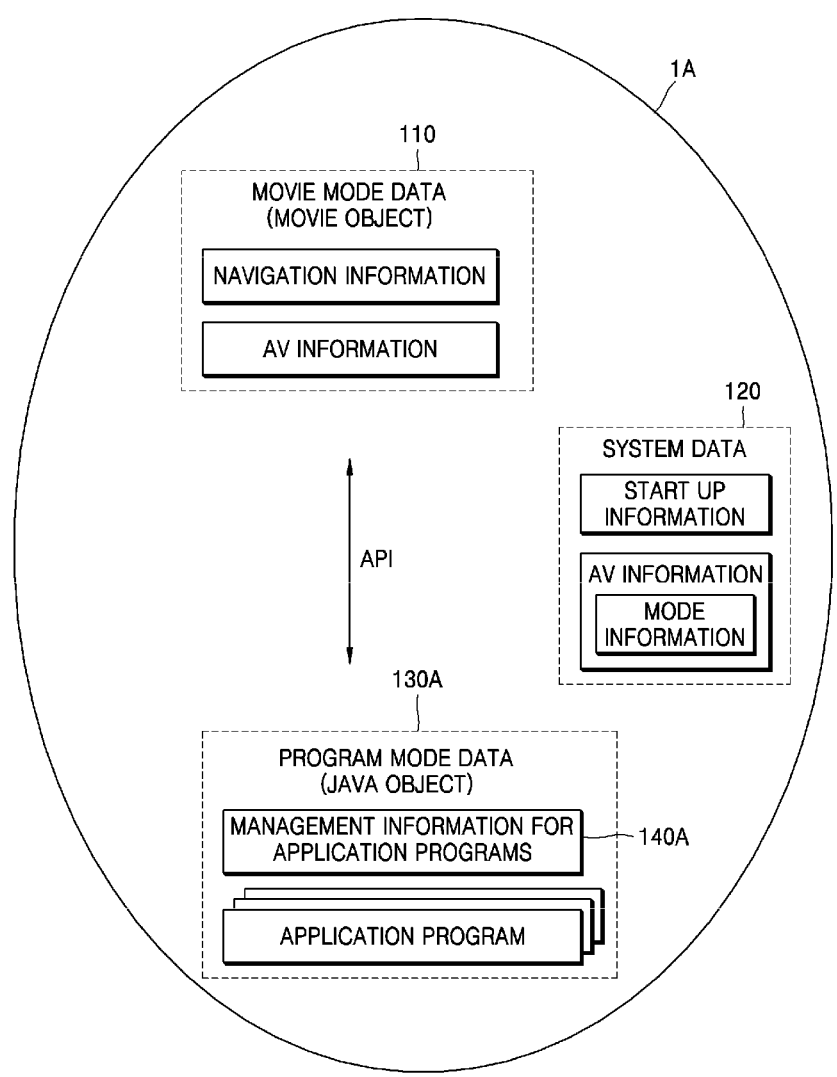
FIG. 11 is an illustration of the types of data recorded in a storage medium according to another embodiment of the present invention.

In summary, the reproducing apparatus according to an embodiment of the present invention is an apparatus for displaying AV data recorded on a storage medium according to a proper display mode among a movie mode or a program mode using specific mode data. That is, the reproducing apparatus reads movie mode data 110, program mode data 130, system data 120, and management information for application programs 140 as illustrated in FIG. 1 or 11 from a storage medium 1 or 1A using the read unit 540, and reproduces the data using relevant reproducing engines. Here, the system data 120 is transmitted to the application manager 588 and used to determine the mode and the data to be first reproduced based on an entry point in start up data of the system data. The reproducing apparatus refers to the system data 120 during reproduction. If a mode change occurs or if a title is searched for, an entry point of a corresponding object is transmitted to the corresponding reproducing engine that reproduces the object and reproduced.

In the case where the management information for application programs 140 exists separately from the other data as illustrated in FIG. 1, the management information for application programs 140 is also transmitted to the application manager 588 and used to manage the program mode data 130, such as a plurality of JAVA applications, in a title-by-title basis and smoothly manage memory when the plurality of JAVA applications are executed.

According to another aspect, in the case where the management information for application programs 140A is included in the program mode data 130A (i.e., a JAVA object), the program engine 582 reads the program mode data 130A and controls the execution of a plurality of applications by referring to the management information for application programs 140A included in the program mode data 130A. While shown as being separate, it is understood that the management information 140, 140A and mode data 130, 130A can be included together on a common medium 1 or 1A.

In addition, the application manager 588 includes the user input receiving and processing unit for processing a user's input and transmitting the user's input to a reproducing engine for a relevant mode. Examples include, but are not limited to, data received through displays, graphical user interfaces, keyboards, remote controls and other like input devices.

Figure 2:
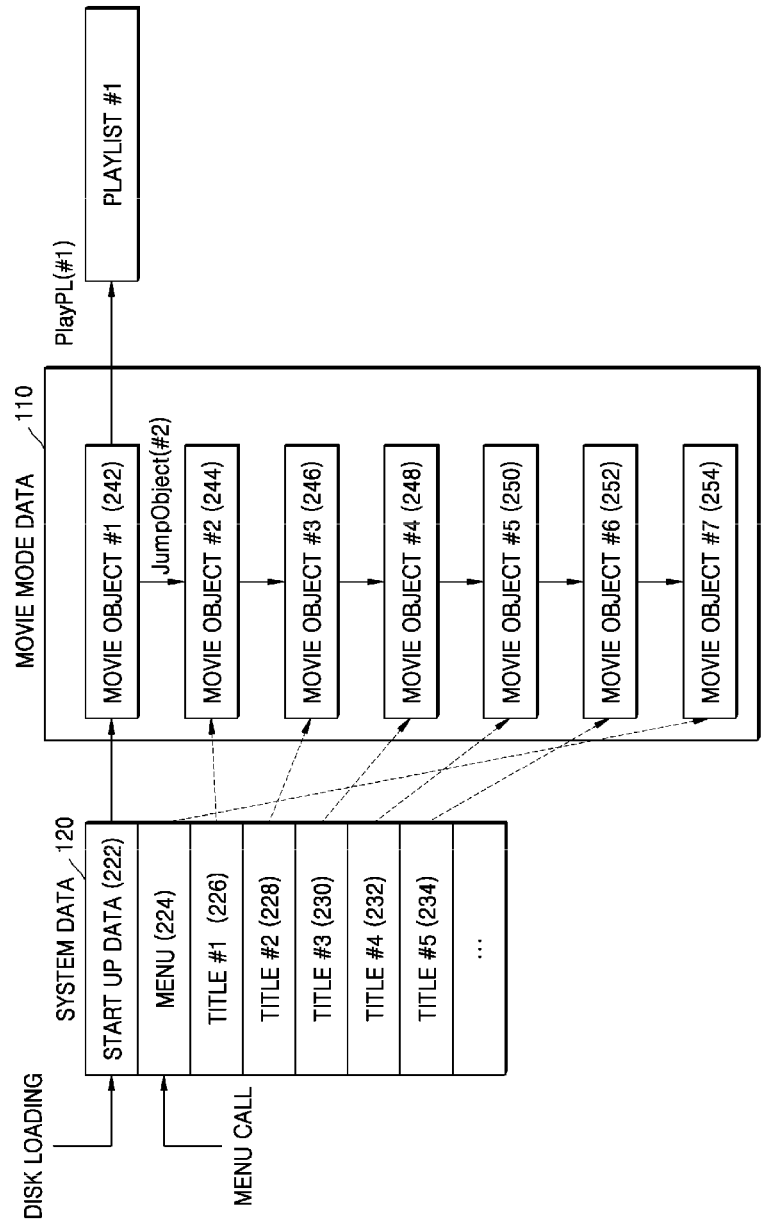
FIG. 2 is a reference diagram for explaining a method of reproducing movie mode data using system data according to an embodiment of the present invention.

A method of reproducing a storage medium according to an embodiment of the present invention will now be described in detail based on the structure of the reproducing apparatus described in relation to FIGS. 1, 2, 5 and 6. FIG. 2 is a reference diagram for explaining a method of reproducing the movie mode data 110 using the system data 120 according to an embodiment of the present invention. Referring to FIG. 2, the system data 120 read through the read unit 540 when the reproducing apparatus is initialized is transmitted to the application manager 588. The application manager 588 refers to start up data 222, a menu 224, and entry points of titles #1-#5, 226, 228, 230, 232, 234 . . . in the system data 120. When an entry point of a movie object to be reproduced first (i.e., movie object #1 242) is transmitted to the navigation engine 584 through the system data 120, the navigation engine 584 transmits navigation commands, such as PlayPL (#1), included in the movie object #1 242 to the presentation engine 586, and thereby movie mode reproduction starts.

After continuing the reproduction using the navigation commands included in the movie object to be reproduced first (i.e., movie object #1 242), the reproduction of the next movie object #2 244 is started by a final navigation command in the current movie object. For example, the movie object #2 244 corresponding to a title #1 is reproduced according to a final navigation command JumpObject(#2) in the movie object #1 242.

If there is no title change requested by a user, as solid-line arrows shown in FIG. 2, each movie object is reproduced in sequence as described above (i.e., movie object #3 246, movie object #4 248, movie object #5 250, movie object #6 252, and movie object #7 254), and after the last movie object (i.e., a movie object #7 254 of FIG. 2), the reproducing apparatus stops or freezes the last scene according to the last navigation command of movie objects set by the content producer.

In a general movie mode (i.e., when reproducing AV data), single title information executes one movie object as illustrated in FIG. 2. Even if a plurality of movie objects can be executed in sequence (i.e., reproduction of the next movie object after finishing one movie object), the simultaneous reproduction of two or more movie objects is not allowed. Thus, a reproduction range of AV data can be clearly determined as during reproduction of a specific movie object or during reproduction of continuous movie objects.

The title information 226, 228, 230, 232, 234 . . . included in the system data 120 illustrated in FIG. 2 is a logical concept to allow the user to access a specific reproducing scene (i.e., random access). While not required in all aspects, each item of title information can include entry point information, which is a reproduction start location of a movie object corresponding to a relevant title, and information regarding whether there is title access by the user. Thus, besides the continuous reproduction, a specific scene can be searched for and then reproduction can be continued from that scene (as indicated by the dashed lines in FIG. 2).

Figure 3:
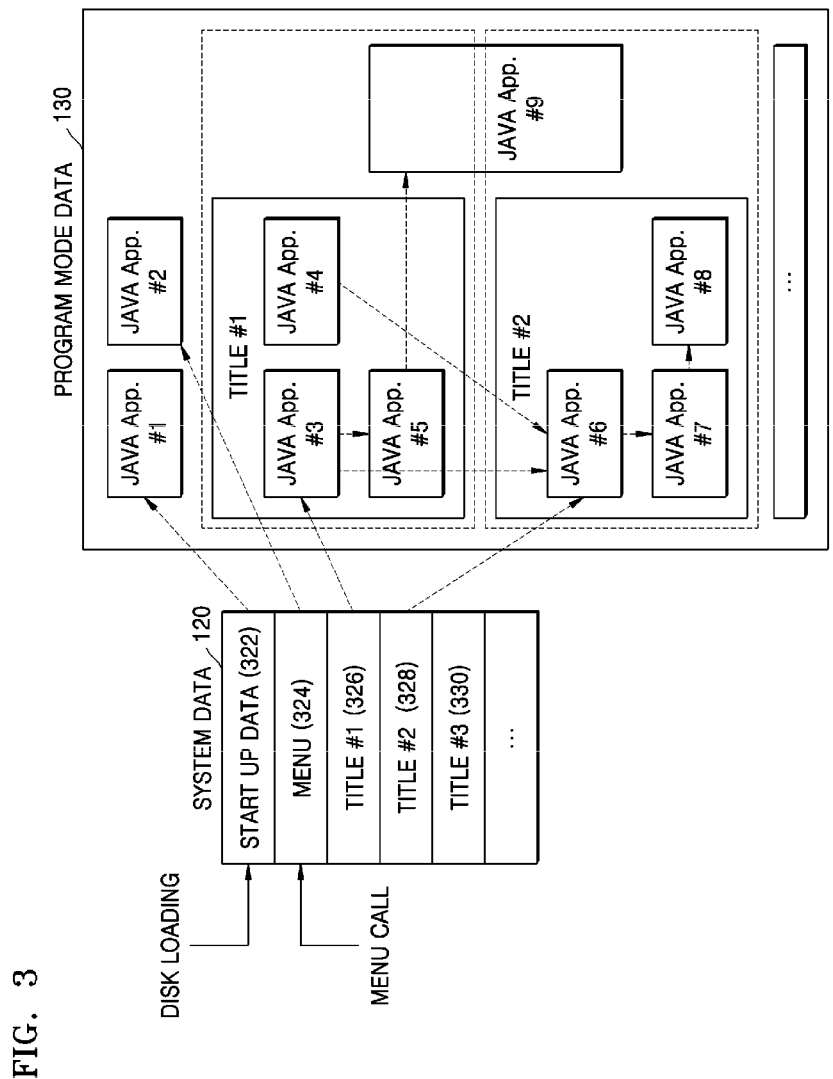
FIG. 3 is a reference diagram for explaining a method of reproducing program mode data using system data according to an embodiment of the present invention.

FIG. 3 is a reference diagram for explaining a method of reproducing the program mode data 130 using the system data 120 according to an embodiment of the present invention. A method of navigating JAVA applications will be described as an example of the program mode in which an additional function is provided when AV data is reproduced. For convenience of description, it is assumed that the program mode indicates a JAVA mode. However, it is understood that other types of applications and languages can be used.

Referring to FIGS. 3 and 6, the system data 120 read through the read unit 540 when the reproducing apparatus is initialized is transmitted to the application manager 588 through the system data buffer 568. The application manager 588 refers to start up data 322, a menu 324, and entry points of titles 326, 328, 330 . . . in the system data 120. The application manager 588 transmits an entry point in the referred system data 120 (i.e., an entry point of a JAVA application to be reproduced first #1), to a JAVA engine (i.e., the program engine 582 of FIG. 6). The JAVA engine reproduces the JAVA application #1.

A plurality of JAVA applications can correspond to a single item of title information, since the plurality of JAVA applications can operate simultaneously. As shown, the start up data 322 corresponds to JAVA application #1. The menu 324 corresponds to JAVA application #2. The title #1 326 corresponds to JAVA applications #3, #4, and #5. The title #2 328 corresponds to JAVA applications #6, #7, and #8. As also shown, JAVA application #3 refers to JAVA application #5, which refers to JAVA application #9 not uniquely within title #1 and which does not terminate at the conclusion of title #1. JAVA applications #3 and #4 refer to JAVA application #6, which is in title #2 328. JAVA application #6 refers to JAVA application #7. JAVA application #7 refers to JAVA application #8. Further, at the start of title #1 326, JAVA application #3 is directly referred to, while JAVA application #4 is otherwise referred to during execution of title #1 326. At the start of title #2 328, JAVA application #6 is directly referred to.

Each of the JAVA applications illustrated in FIG. 3 (i.e., JAVAApp #1, JAVAApp #2, JAVA App #3, JAVA App #4, JAVA App #5, JAVA App #6, JAVA App #7, JAVA App #8, JAVA App #9 . . . ) is composed of commands provided by a JAVA program. Though the commands are executed in the recorded order, they are designed so that other commands can be executed during the execution of one command. In addition, even after all commands are executed, the JAVA applications need not be terminated since a command related to the termination (e.g., exit( )) must be executed to terminate a JAVA application. Thus, unless the command related to the termination is executed, a plurality of JAVA applications related to a single item of title information continuously perform reproduction according to each life cycle of the JAVA applications.

Due to this characteristic, a specific JAVA application is continuously in a reproduction state regardless of the concept of a title, and thereby the reproduction range of JAVA applications related to a specific title is uncertain. In addition, when a title is changed, it is also not certain how a plurality of JAVA applications being reproduced according to each life cycle of the JAVA applications are processed.

To solve these and other problems, the management information for application programs 140 is used. While not required in all aspects, the management information for application programs 140 according to an embodiment of the present invention can exist separately from other data as illustrated in FIG. 1. The management information for application programs 140A according to another embodiment of the present invention can be included in the program mode data 130A as illustrated in FIG. 11, and can be, for example, binary or text type data.

The case where the management information for application programs 140 exists separately as illustrated in FIG. 1 will be described as an embodiment of the present invention, and then the case where the management information for application programs 140A is included in the program mode data 130A as illustrated in FIG. 11 will be described as another embodiment of the present invention.

Figure 4:
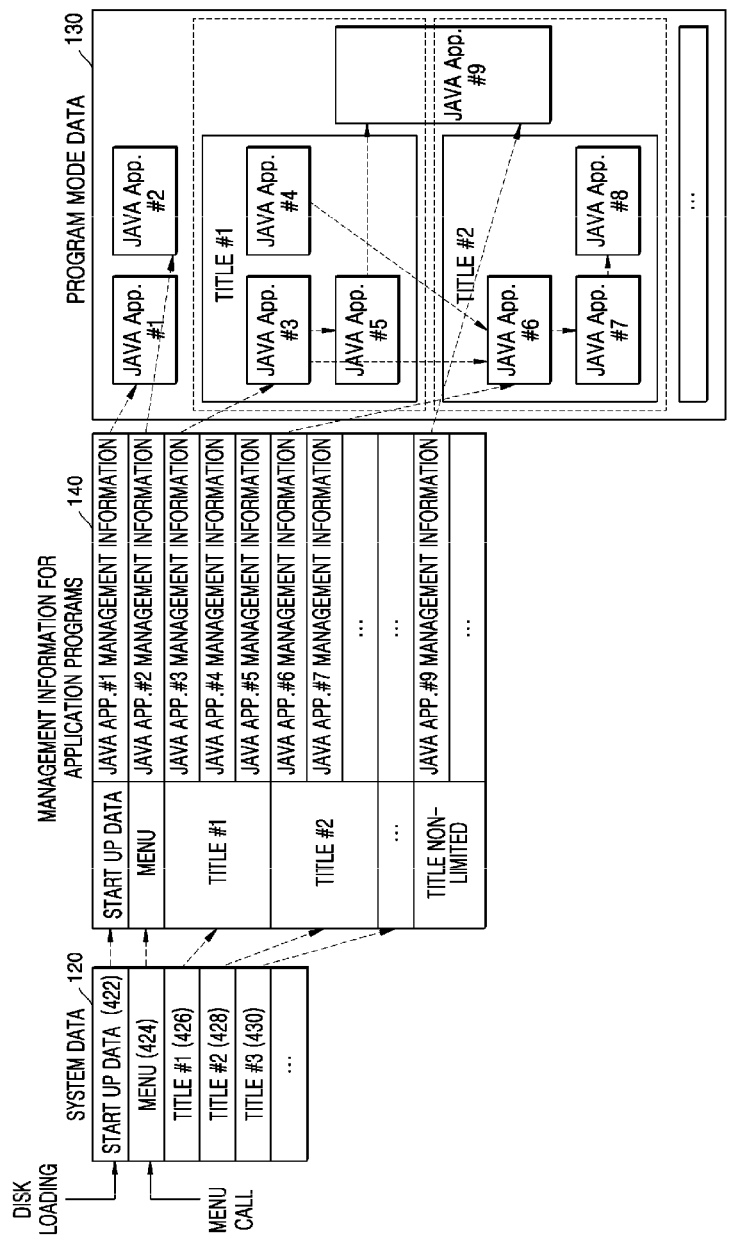
FIG. 4 is a reference diagram for explaining a method of reproducing program mode data using system data and management information for application programs according to an embodiment of the present invention.

The embodiment shown in FIG. 1 will now be described in more detail. FIG. 4 is a reference diagram for explaining a method of reproducing the program mode data 130 using the system data 120 and the management information for application programs 140 according to an embodiment of the present invention. Referring to FIG. 4, to execute a JAVA program application JAVAApp. #3 starting to be reproduced by a title #1 that is title information in the system data 120, the application manager 588 reads management information for an application program of the title #1 (JAVAApp. #3 Management Information of the title #1) from among the management information for application programs 140, and executes the JAVA program application JAVA App. #3 based on the management information. Similarly, JAVAApp. #1 Management Information within the start up data 422 manages the execution of the JAVA program application JAVA app. #1, JAVAApp. #2 Management Information within the menu 424 manages the execution of the JAVA program application JAVA app. #2, JAVA App. #4 Management Information within the title #1 426 manages the execution of the JAVA program application JAVA app. #4, JAVA App. #5 Management Information within the title #1 426 manages the execution of the JAVA program application JAVA app. #5, JAVA App. #6 Management Information within the title #2 428 manages the execution of the JAVA program application JAVA app. #6, and JAVA App. #7 Management Information within the title #2 428 manages the execution of the JAVA program application JAVA app. #7. JAVA App. #9 Management Information, which is not within one of the titles, manages the execution of the JAVA program application JAVA app. #9. By doing this, regardless of the characteristics of JAVA applications as described above, the reproduction range of JAVA applications related to a specific title is clear, and even if there is a title change, the execution of an application can be controlled based on corresponding management information.

Likewise, the JAVA applications in a JAVA object can be reproduced regardless of their execution order, more than one application can be simultaneously executed, and termination times of applications cannot be predicted. Thus, the management information for application programs 140 is necessary in order to know the states of JAVA applications at a specific time or in a specific situation (e.g. in a range of a specific title).

It is preferable, but not required, that the management information for application programs 140 includes the following types of information: title information, JAVA application information, and operation and state information of each JAVA application.

Title information is information about a title. The title is a logical unit by which a user can perceive a unit of AV data, and the user can access information stored in a storage medium through titles. A menu provided to the user is also a kind of title.

JAVA application information belonging to a title is information about the JAVA applications referenced by the title. Specifically, each title can include a plurality of JAVA applications. This information regards JAVA applications which can be executed together in one title.

Operation and state information of each JAVA application refers to information that specifies operation and state information of each JAVA application. By way of example, the operation and state information can include a starting time, a starting method, a terminating time, and/or a terminating method. In addition, when a certain title is selected by a user's input or a navigation command as a first execution application designated by a title, the information can include information regarding a JAVA application to be reproduced first in the certain title and memory allocation information of the JAVA application.

Figure 7:
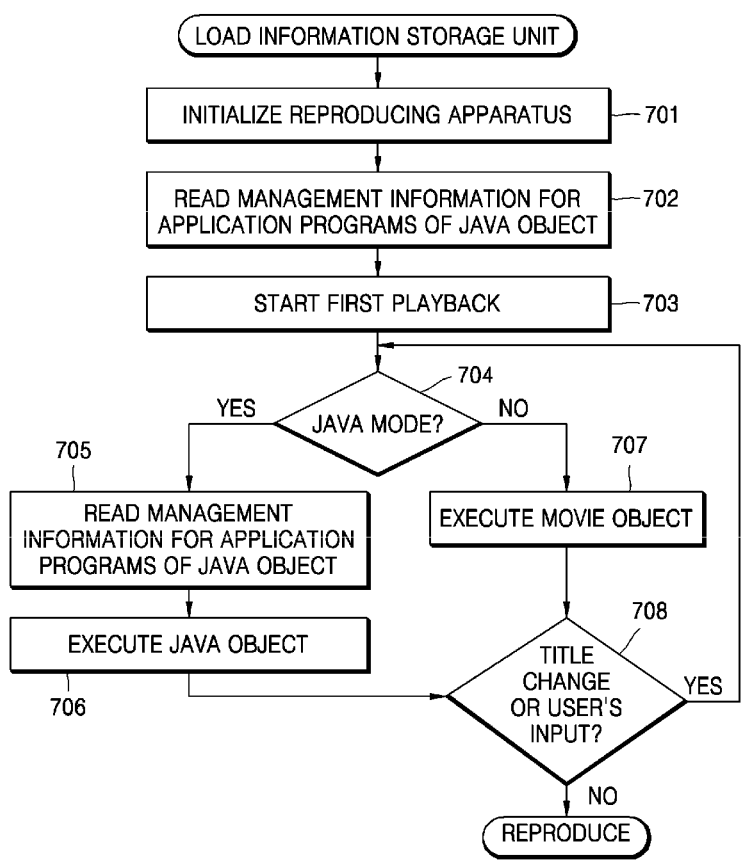
FIG. 7 is a flowchart for explaining a method of reproducing a storage medium according to an embodiment of the present invention.

A method of reproducing a storage medium including the system data 120 and the management information for application programs 140 according to an embodiment of the present invention will now be described with reference to a flowchart as shown in FIG. 7. Referring to FIG. 7, when the storage medium including the system data 120 and the management information for application programs 140 is loaded into the reproducing apparatus, the reproducing apparatus initializes various kinds of system parameters and global parameters to predetermined values in operation 701. In addition, in the initialization, a process of reading the system data 120 required for reproduction through the read unit 540 is included. The management information for application programs 140 required for reproduction in the program mode may be pre-read in operation 702. After initialization of the reproducing apparatus is finished, the first playback, in which an object to be reproduced first is designated, starts by referring to start up information of the system data 120 in operation 703.

Here, mode information included in a title designated during the first playback is read, and thereby the mode of the title is determined. If the mode information of the title is the movie mode in operation 704, reproduction of a movie object referred to in the first playback starts in operation 707 (refer to FIG. 2). If the mode information of the title is the program mode in operation 704, the management information for application programs 140 required for reproducing program mode JAVA applications is read in operation 705. If the management information for application programs 140 has been already read in the initialization of the reproducing apparatus 701, operation 705 can be omitted. That is, the management information for application programs 140 can be pre-read in the initialization of the reproducing apparatus, or read when a JAVA application is reproduced in the program mode, according to the specification of the reproducing apparatus.

The application manager 588 executes JAVA applications belonging to a specific title by referring to the management information for application programs 140 in operation 706.

If a title is changed by a navigation command, an API, or a user's input during movie or program mode reproduction, the application manager 588 can control the reproduction of corresponding mode data through the procedures described above.

Figure 8:
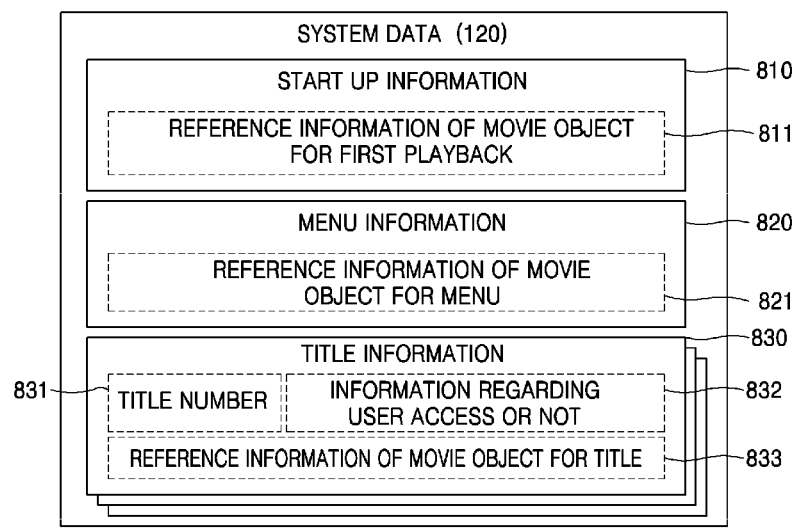
FIG. 8 is an illustration of system data included in a storage medium in which only movie mode data is recorded according to an embodiment of the present invention.

The structure of the system data 120 for controlling reproduction according to the movie mode or the program mode will now be described in detail with reference to FIGS. 8 and 9. FIG. 8 is an illustration of the system data 120 included in a storage medium in which only movie mode data is recorded according to an embodiment of the present invention. Referring to FIG. 8, the system data 120 includes start up information 810, menu information 820, and title information 830, which includes reference information of movie object for first playback 811, reference information of movie object for menu 821, and reference information of movie object for title 833 of movie objects that should be executed to respectively reproduce a first playback, a menu, and a title. Further, the title information 830 includes a title number 831 and information regarding user access or not 832. For the movie mode, there is no case where two or more movie objects are simultaneously executed as described above. Thus, even if each of the items of information 810, 820, and 830 includes reference information of only one movie object, reproduction can be smoothly performed.

However, for a storage medium which further includes the program mode data 130 (i.e., which supports the full mode), since a plurality of JAVA applications in one title can be reproduced as described above, reproduction can be performed by referring to the separate management information for application programs 140 in which the life cycle of each JAVA application is defined. FIG. 9 is an illustration of the system data 120 included in a storage medium in which both movie mode data and program mode data are recorded according to an embodiment of the present invention.

Figure 9:
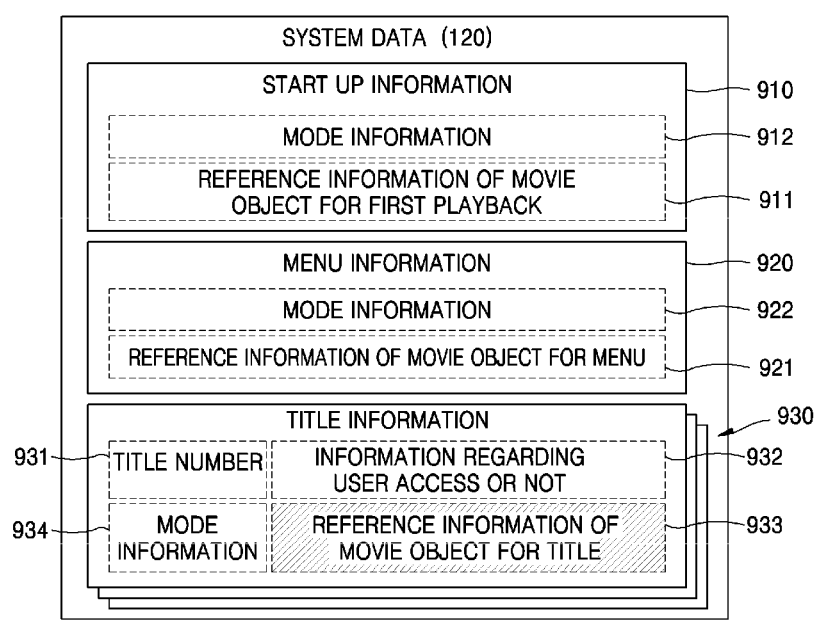
FIG. 9 is an illustration of system data included in a storage medium in which both movie mode data and program mode data are recorded according to an embodiment of the present invention.

Referring to FIG. 9, unlike the system data 120 for only the movie mode illustrated in FIG. 8, the system data 120 for reproducing full mode data includes mode information 912, 922, and 934 for respective items of information 910, 920, and 930. Reference information 911, 921, and 933 within respective items of start up information 910 (e.g., 422), menu information 920 (e.g., 424), and title information 930 (e.g., 426 through 430) and generally correspond to reference information 811, 821, and 833 shown in FIG. 8. Further, a title number 931 and information regarding user access or not 932 within the title information 930 generally correspond to the title number 831 and information 832 shown in FIG. 8. The mode information indicates whether data recorded in a relevant storage medium is movie mode data or program mode data and allows the reproducing apparatus to distinguish between the different modes.

If the mode information indicates the movie mode, the data is reproduced by referring to the movie objects described in FIG. 8. If the mode information indicates the program mode, information referring to specific navigation data such as information referring to movie objects is not used. Instead, the application manager 588 reproduces relevant program mode data by referring to the management information for application programs 140 described above, and/or the program engine 582 reproduces a relevant JAVA object by referring to the management information for application programs 140A included in the JAVA object.

Figure 10:
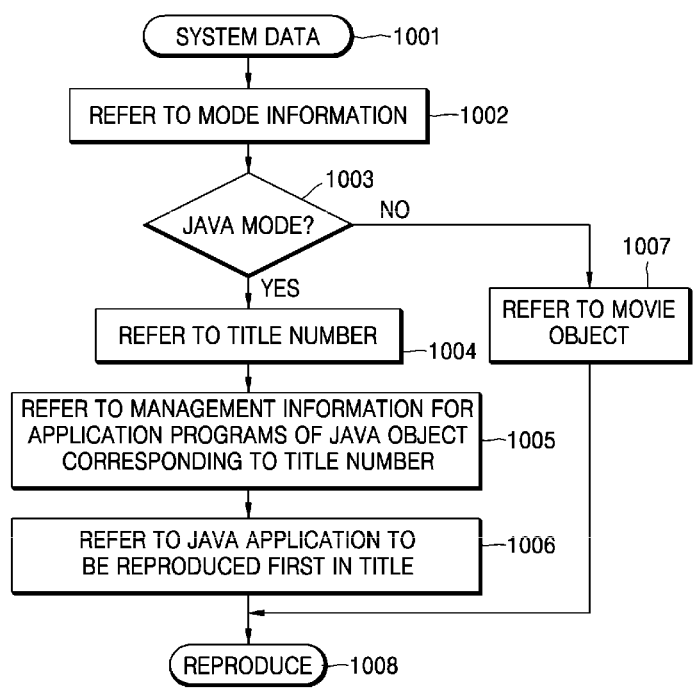
FIG. 10 is a flowchart for explaining a method of reproducing a storage medium using system data and management information for application programs according to an embodiment of the present invention.

FIG. 10 is a flowchart for explaining a method of reproducing a storage medium using the system data 120 and the management information for application programs 140 according to an embodiment of the present invention. Referring to FIG. 10, the application manager 588, which has read the system data 120 in operation 1001, checks mode information 912, 922 or 934 included in start up information 910, menu information 920, or title information 930 in operation 1002 when the application manager 588 analyzes the start up information 910, the menu information 920, or the title information 930 by using a navigation command, an API, or a user's input. If the mode information 912, 922, or 934 indicates the movie mode in operation 1003, reference information of a movie object included in the start up information 910, the menu information 920, or the title information 930 is used in operation 1007, and then corresponding AV data is reproduced in operation 1008.

If the mode information 912, 922 or 934 indicates the program mode (e.g., the JAVA mode), in operation 1003, a title number 426, 428, 430, start up data 422, and/or the menu 424 is referred to in operation 1004, and the management information for application programs 140 of a JAVA object corresponding to the title number is referred to in operation 1005. Then, a JAVA application to be reproduced first (e.g. JAVAApp. #1, JAVAApp. #2, JAVAApp. #3, JAVAApp. #6, or JAVAApp. #9), which is defined in a corresponding title, is referred to in operation 1006. The application manager 588 reproduces a corresponding JAVA application by transmitting information regarding a JAVA application to be reproduced first to the program engine 582 using operation and state information of JAVA applications belonging to a specific title in the management information for application programs 140 of a JAVA object in operation 1008.

The case where the management information for application programs 140A is included in a JAVA object will now be described, as another embodiment of the present invention shown in FIG. 11. Referring to FIG. 11, the storage medium includes the movie mode data 110, the program mode data 130A, and the system data 120. In particular, the management information for application programs 140A is included in the program mode data 130A.

The movie mode data 110, the program mode data 130A, the system data 120, and the management information for application programs 140A are generally the same as illustrated in FIG. 1. However, unlike the case where the management information for application programs 140 exists separately from the other data as illustrated in FIG. 1, the management information for application programs 140A is included in the program mode data 130A. That is, the program mode data 130A includes a plurality of application programs as well as the management information for application programs 140A corresponding to titles. The program mode data 130A is implemented as a JAVA object, which includes at least one JAVA application program included in one title and the management information for application programs 140A. However, it is understood that other types of objects can be used instead of or in addition to JAVA objects.

Figure 12:
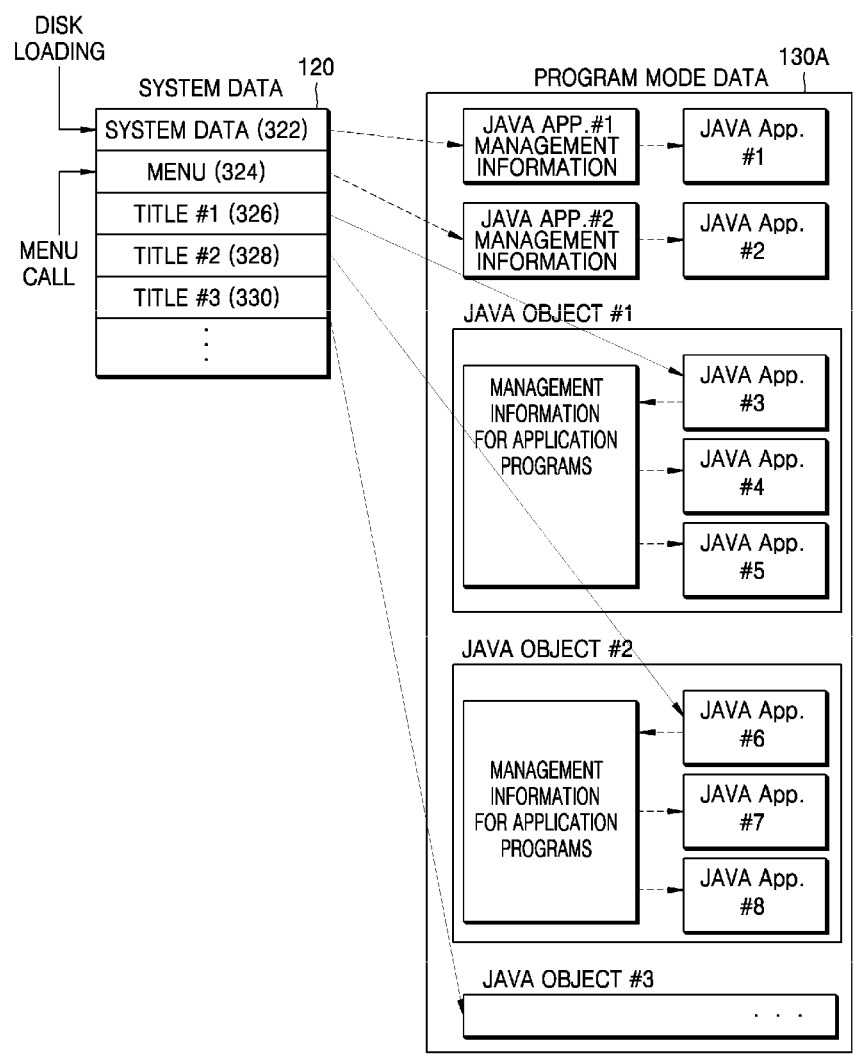
FIG. 12 is a reference diagram for explaining a method of reproducing the program mode data using system data and management information for application programs according to another embodiment of the present invention.

FIG. 12 is a reference diagram for explaining a method of reproducing the program mode data 130A using the system data 120 and the management information for application programs 140A according to another embodiment of the present invention. Referring to FIG. 12, the application manager 588 reads a JAVA object #1, which is the program mode data 130A whose reproduction is started by a title #1 326, which is title information of the system data 120, and extracts management information for each JAVA application programs #3 through #5 included in JAVA object #1. The extracted management information includes operation information and state information required to execute at least one JAVA application program included in a corresponding JAVA object. The JAVA applications included in the corresponding JAVA object can be executed based on the management information. A similar set of operations is performed with respect to start up data 322, menu 324, title #2 328, and title #3 330 in regards to corresponding JAVA app. #1 management information, JAVA app. #2 management information, JAVA object #2 management information, and JAVA object #3 management information in order to utilize JAVA application program #1, JAVA application program #2, and/or JAVA application programs #6 through #8. Thus, regardless of the characteristics of JAVA applications described above, the reproduction range of JAVA applications related to a specific title is clear, and even if there is a title change, execution of an application can be controlled based on corresponding management information.

The detailed contents of the management information for application programs 140A are generally the same as illustrated in FIG. 4.

Figure 13:
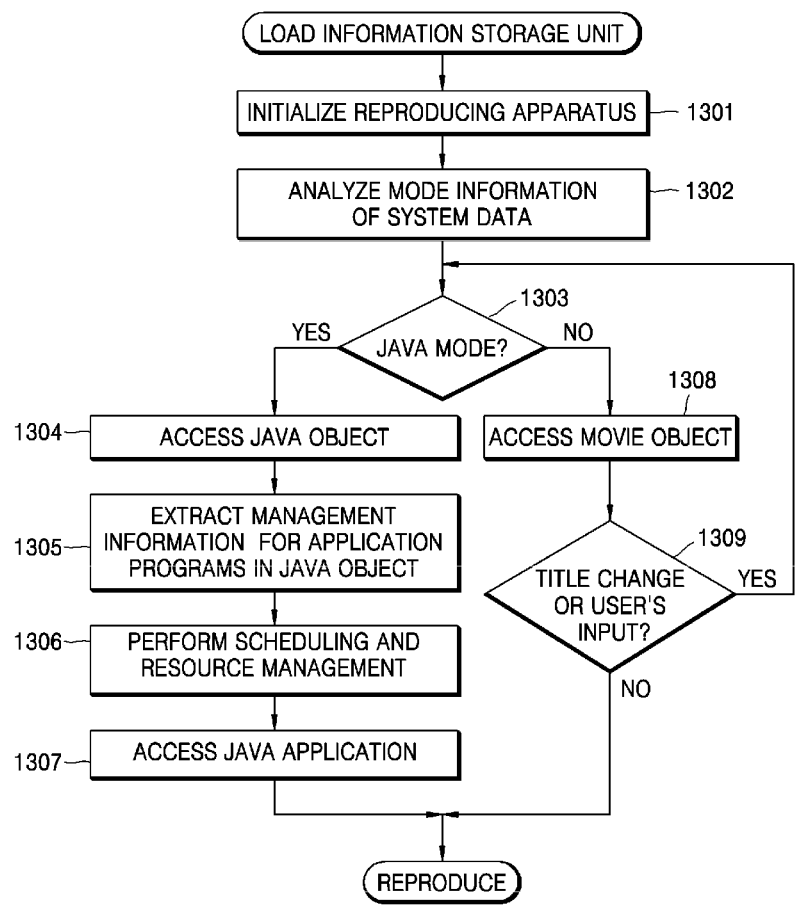
FIG. 13 is a flowchart for explaining a method of reproducing a storage medium according to another embodiment of the present invention.

FIG. 13 is a flowchart for explaining a method of reproducing a storage medium according to another embodiment of the present invention. Referring to FIG. 13, when the storage medium including the system data 120 and the management information for application programs 140A is loaded into the reproducing apparatus, the reproducing apparatus initializes various system parameters and global parameters in the reproducing apparatus to predetermined values in operation 1301. In addition, the initialization includes reading the system data 120 required for reproduction through the read unit 540. The application manager 588 analyzes mode information included in the system data 120 in operation 1302.

If the analyzed mode information does not indicate the JAVA mode (i.e., if the analyzed mode information indicates the movie mode) in operation 1303, a movie object referred to by a relevant title is accessed in operation 1308. If the mode information of the title indicates the JAVA mode in operation 1303, a JAVA object referred to by a relevant title is accessed in operation 1304, and the management information for application programs 140A included in the JAVA object is extracted in operation 1305. Scheduling and resource management required to execute JAVA application programs is performed based on the extracted management information for application programs 140A in operation 1306. JAVA applications included in the JAVA object are accessed in operation 1307, and the JAVA application programs are executed based on the extracted management information for application programs 140A.

If a title is changed by a navigation command, an API, or a user's input during movie or JAVA mode reproduction, the application manager 588 can control the reproduction of corresponding mode data through the procedures described above.

Figure 14:
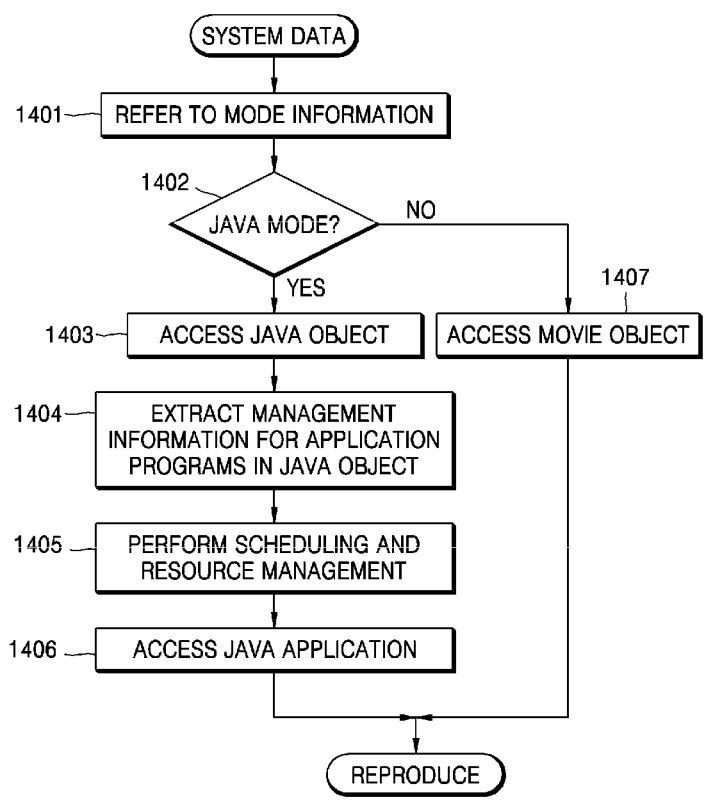
FIG. 14 is a flowchart for explaining a method of reproducing a storage medium using system data and management information for application programs according to another embodiment of the present invention.

FIG. 14 is a flowchart for explaining a method of reproducing a storage medium using the system data 120 and the management information for application programs 140A according to another embodiment of the present invention. Referring to FIG. 14, in operation 1401, the application manager 588 refers to mode information included in the system data 120 when the application manager 588 analyzes start up information, menu information, or title information by using a navigation command, an API, or a user's input. If the mode information indicates the movie mode in operation 1402, reference information of a movie object included in the start up information, the menu information, or the title information is used in operation 1407, and then corresponding AV data is reproduced.

If the mode information indicates the program mode (i.e., the JAVA mode, in operation 1402), a JAVA object referred to by a relevant title is accessed in operation 1403, and the management information for application programs 140A included in the JAVA object is extracted in operation 1404. Scheduling and resource management required to execute JAVA application programs is performed based on the extracted management information for application programs 140A in operation 1405. The application manager 588 accesses JAVA application programs included in the JAVA object in operation 1406 and executes the JAVA application programs using operation information and state information included in the extracted management information for application programs 140A.

As described above, in the program mode, the application manager 588 manages a plurality of JAVA applications by referring to the management information for application programs 140 or 140A according to an embodiment of the present invention. That is, scheduling and management of resources, such as memory, are performed to smoothly execute a plurality of applications. In other words, if an application which operates in a unit of title is determined, a memory space required by each application can be determined. In addition, there can exist applications, which are not simultaneously executed by determining starting times and terminating times according to characteristics of the applications. Since the applications can use the same memory space, required memory capacity can be reduced, thereby efficiently managing the memory.

Though embodiments using JAVA applications have been described, the same methods can equally be applied to HTML, program languages, and/or other applications.

The embodiments of the present invention can be written as computer programs and can be implemented in general-use and/or special purpose digital computers that execute the programs using a computer readable recording medium. Examples of the computer readable recording medium include magnetic storage media (e.g. ROM, floppy disks, hard disks, etc.), and optical recording media (e.g. CD-ROMs, DVDs, etc.). The computer readable recording medium can also be distributed over network coupled computer systems so that the computer readable code is stored and executed in a distributed fashion.

As described above, if a storage medium according to an embodiment of the present invention is used, a plurality of program-based applications for providing additional functions in addition to the reproduction of AV data can be managed, and when the plurality of applications are executed, memory can be smoothly managed. That is, for a storage medium including movie mode AV data and program mode data to which a program function is added, a plurality of application programs can be smoothly reproduced using system data and management information for application programs according to an embodiment of the present invention.

While this invention has been particularly shown and described with reference to preferred embodiments thereof, it will be understood by those skilled in the art that various changes in form and detail may be made therein without departing from the spirit and scope of the invention as defined by the appended claims. The above-described embodiments should be considered in a descriptive sense only and are not for purposes of limitation. Therefore, the scope of the invention is defined not by the detailed description of the invention but by the appended claims and equivalents thereof, and all differences within the scope will be construed as being included in the present invention.

What is claimed is:

1. A reproducing method comprising:
reading system data from a storage medium, the storage medium comprising movie mode data for reproducing audio-visual (AV) data, program mode data including a plurality of JAVA application programs for providing additional functions using the AV data and management information for managing the execution of the JAVA application programs in a unit of titles, and the system data for controlling the execution of the movie mode data and the program mode data, the system data comprising mode information and entry point information for each title to be reproduced, the entry point information being separate from the mode information, the mode information indicating a movie mode or a program mode so as to indicate whether a reproduction mode of the corresponding title is the movie mode using the movie mode data or the program mode using the program mode data, the entry point information being for referring to a JAVA object when the mode information of the corresponding title is the program mode and for referring to a movie object when the mode information of the corresponding title is the movie mode;
for the each title to be reproduced, determining a reproduction mode by referring to the mode information included in the read system data
reproducing a JAVA object referred by the entry point information included in the read system data when the determined reproduction mode is the program mode; and
reproducing a movie object referred by the entry point information included in the read system data when the determined reproduction mode is the movie mode,
wherein the management information comprises life cycle information for the JAVA application programs to be managed by the management information, and
the reproducing of the JAVA object comprises managing a life cycle of at least one JAVA application program associated with the corresponding title by referring to the management information included in the JAVA object.

2. The method of claim 1, wherein the movie object comprises a navigation command for controlling reproduction of the AV data.

3. The method of claim 1, wherein the management information comprises control information and state information to be used when the at least one JAVA application program to be executed in the corresponding title is executed.

4. The method of claim 1, wherein the system data comprises start up title information comprising mode information and entry point information of a title to be reproduced when the storage medium is first read and menu title information comprising mode information and entry point information of a title to be used to display a menu.

5. A non-transitory computer readable medium having recorded thereon a computer readable program having executable code executed by at least one computer to perform a reproducing method, the reproducing method comprising:

reading system data from a storage medium, the storage medium comprising movie mode data for reproducing audio-visual (AV) data, program mode data including a plurality of JAVA application programs for providing additional functions using the AV data and management information for managing the execution of the JAVA application programs in a unit of title, and the system data for controlling the execution of the movie mode data and the program mode data, the system data comprising mode information and entry point information for each title to be reproduced, the entry point information being separate from the mode information, the mode information indicating a movie mode or a program mode so as to indicate whether a reproduction mode of the corresponding title is the movie mode using the movie mode data or the program mode using the program mode data, the entry point information being for referring to a JAVA object when the mode information of the corresponding title is the program mode and for referring to a movie object when the mode information of the corresponding title is the movie mode;

for the each title to be reproduced, determining a reproduction mode by referring to the mode information included in the read system data;

reproducing a JAVA object referred by the entry point information included in the read system data when the determined reproduction mode is the program mode; and reproducing a movie object referred by the entry point information included in the read system data when the determined reproduction mode is the movie mode, wherein the management information comprises life cycle information for the JAVA application programs to be managed by the management information, and the reproducing of the JAVA object comprises managing a life cycle of at least one JAVA application program associated with the corresponding title by referring to the management information included in the JAVA object.

6. The non-transitory computer readable medium of claim 5, wherein the movie object comprises a navigation command for controlling reproduction of the AV data.

7. The non-transitory computer readable medium of claim 5, wherein the management information comprises control information and state information to be used when the at least one JAVA application program to be executed in the corresponding title is executed.

8. The non-transitory computer readable medium of claim 5, wherein the system data comprises start up title information comprising mode information and entry point information of a title to be reproduced when the storage medium is first read and menu title information comprising mode information and entry point information of a title to be used to display a menu.

9. A reproducing apparatus configured to display audio-visual (AV data) recorded in a storage medium, the reproducing apparatus comprising:

a read unit configured to read system data from the storage medium, the system data read through the read unit when the reproducing apparatus is initialized, the storage medium comprising movie mode data for reproducing the audio-visual (AV) data, program mode data including a plurality of JAVA application programs for providing additional functions using the AV data and management information for managing the execution of the JAVA application programs in a unit of title, and the system data for controlling the execution of the movie mode data and the program mode data, the system data comprising mode information and entry point information for each title to be reproduced, the entry point information being separate from the mode information, the mode information indicating a movie mode or a program mode so as to indicate whether a reproduction mode of the corresponding title is the movie mode using the movie mode data or the program mode using the program mode data, the entry point information being for referring to a JAVA object when the mode information of the corresponding title is the program mode and for referring to a movie object when the mode information of the corresponding title is the movie mode; and a reproducing unit, for the each title to be reproduced, configured to determine a reproduction mode by referring to the mode information included in the read system data, reproduce a JAVA object referred by the entry point information included in the read system data when the determined reproduction mode is the program mode, and reproduce a movie object referred by the entry point information included in the read system data when the determined reproduction mode is the movie mode, wherein the management information comprises life cycle information for the JAVA application programs to be managed by the management information, and the reproducing unit manages a life cycle of at least one JAVA application program associated with the corresponding title by referring to the management information included in the JAVA object.

10. A non-transitory storage medium with respect to which an apparatus transfers data the non-transitory storage medium comprising:

movie mode data for reproducing audio-visual (AV) data;

program mode data including a plurality of JAVA application programs for providing additional functions using the AV data and management information for managing the execution of the JAVA application programs in a unit of title; and system data for controlling the execution of the movie mode data and the program mode data, wherein the system data comprises mode information and entry point information for each title to be reproduced, the entry point information being separate from the mode information, the mode information indicates a movie mode or a program mode so as to indicate whether a reproduction mode of the corresponding title is the movie mode using the movie mode data or the program mode using the program mode data, and the entry point information is for referring to a JAVA object when the mode information of the corresponding title is the program mode and for referring to a movie object when the mode information of the corresponding title is the movie mode, wherein the management information comprises life cycle information for at least one JAVA application program associated with the corresponding title and is included in the JAVA object.

* * * * *